United States Patent
Matsuda et al.

[11] 3,864,287
[45] Feb. 4, 1975

[54] PROCESS FOR POLYMERIZING TETRAHYDROFURAN

[75] Inventors: Kazuo Matsuda, Wakayama; Yoshiaki Tanaka, Osaka; Takeyo Sakai, Wakayama, all of Japan

[73] Assignee: Kao Soap Co., Ltd., Tokyo, Japan

[22] Filed: Dec. 27, 1973

[21] Appl. No.: 428,668

[30] Foreign Application Priority Data
Dec. 29, 1972 Japan.................................. 48-2657

[52] U.S. Cl............................................. 260/2 XA
[51] Int. Cl............................................ C08g 23/02
[58] Field of Search .................................. 260/2 XA

[56] References Cited
UNITED STATES PATENTS
3,344,088    9/1967    Miller .................................... 260/2
FOREIGN PATENTS OR APPLICATIONS
667,141    7/1963    Canada ........................... 260/2 XA Primary Examiner—Murray Tillman
Assistant Examiner—C. Seccyro
Attorney, Agent, or Firm—Woodhams, Blanchard and Flynn

[57] ABSTRACT

A process for polymerizing tetrahydrofuran in the presence of organic acid anhydride, super acid salt and sulfuric acid.

6 Claims, 2 Drawing Figures

PROCESS FOR POLYMERIZING TETRAHYDROFURAN

BACKGROUND OF THE INVENTION

1. Field of the Invention

This invention relates to a process for polymerizing tetrahydrofuran employing a novel initiator.

2. Description of the Prior Art

It is known that tetrahydrofuran can be polymerized using various initiators of the Friedel-Crafts type or the organic metal compound type. The polymers produced thus far have not achieved wide spread acceptance. But recently, tetrahydrofuran polymer having hydroxyl radicals at both terminal ends of the polymer chain has become important because of its application to the polyurethane industry. For commercially polymerizing tetrahydrofuran, there have been employed processes wherein fluorosulfuric acid and acetic anhydride-perchloric acid are used as initiators. There are serious problems with these processes such as dangerous chemicals are used, corrosion of equipment is severe, polymerization times are long, and cost is high.

SUMMARY OF THE INVENTION

We have studied the synthesis of polyether glycols having hydroxyl radicals at both terminal ends of the molecule and have found that a substantially colorless polymer can be obtained with a high yield by contacting a cyclic ether such as tetrahydrofuran with an organic acid anhydride-super acid salt-sulfuric acid initiator system. Also, we have found that polyethers having hydroxyl radicals at both terminal ends of the molecule, which polyethers can be effectively used as a starting material for preparing polyurethanes can be produced by a suitable post-treatment such as hydrolysis.

According to this invention tetrahydrofuran is polymerized using an initiator consisting of three conjointly used components, namely, (1) organic acid anhydride, (2) super acid salt and (3) sulfuric acid. It is critical to use all three components jointly for the purposes of this invention. Initiator systems consisting of the above-named three components used individually, or combinations of (a) organic acid anhydride with super acid salt, (b) organic acid anhydride with sulfuric acid (which latter combination is disclosed in Angew. Chem. 72 927 (1960) but which has practically no polymerization activity) and (c) super acid salt with sulfuric acid, do not initiate polymerization at all or cause a very low apparent rate of polymerization or a very low polymerization yield. In contrast the initiator system of this invention consisting of said three components unexpectedly has a much higher activity than the above-described one component and two component systems. The three component initiator of this invention is much superior in terms of polymer yield, color of polymer, apparent rate of polymerization, and cost (because the super acid salt can be repeatedly used), in comparison with conventional initiator systems such as acetic anhydride-perchloric acid, acetic anhydride-$BF_3$ or its ether complex-diketene systems.

The term "super acid salt" used in this invention means salts of acids stronger than 100% sulfuric acid, for example, perchlorates and trifluoromethane sulfonates. These salts can be used separately or as mixtures of two or more of them. The salts of super acids used in this invention are those which are soluble in tetrahydrofuran such as sodium perchlorate, magnesium perchlorate, lithium perchlorate, barium perchlorate, sodium trifluoromethane sulfonate, silver trifluoromethane sulfonate and trifluoromethane sulfonic acid amine salts. The amine includes ammonia, methylamine, dimethylamine, ethylamine, diethylamine, ethylenediamine, n-propylamine, iso-propylamine, butylamine, dibutylamine, tributyl amine, triethylamine, pyridine, iso-butylamine, di-isobutylamine, benzylamine, dibenzylamine, piperidine, dimethylbenzylamine, 2-pipecoline, pyrrolidine, 1,4-diaminobutane, diethylaminoethylamine, dibutylaminopropylamine, diethylaminopropylamine, dimethylaminopropylamine, monomethylaminopropylamine, 1,2-diaminopropane, 1,3-diaminopropane, 3-methoxypropylamine, ethylhexylamine, diethylhexylamine, etc. The amount of the super acid salt used in the process of this invention is in the range of from 0.001 to 0.45 moles per 1 mole of tetrahydrofuran charged into the polymerization system, preferably from 0.001 to 0.20 moles/mole.

The organic acid anhydrides used in the process of this invention include acetic anhydride, succinic anhydride, maleic anhydride and orthosulfobenzoic anhydride. The amount of organic acid anhydride used is from 0.005 to 0.5 moles per one mole of tetrahydrofuran charged into the reaction system.

The sulfuric acid used in the process of this invention has a concentration higher than 50%, preferably a concentration of from 90 to 100%. The amount of sulfuric acid used is from one to two moles (calculated as 100% acid) per 1 mole of acid salt. Although the polymerization of tetrahydrofuran is carried out in the substantial absence of water, the water accompanying the sulfuric acid, if any, is minor in amount and does not substantially affect the polymerization.

According to the present invention, tetrahydrofuran is usually polymerized by dissolving the super acid salt in tetrahydrofuran, adding the required amount of organic acid anhydride, and then adding the sulfuric acid, followed by polymerizing the contents of the polymerization system in a water-free air or in a nitrogen atmosphere. Polymerization can be carried out in the presence or in the absence of a solvent. Any inert solvent can be used so long as it does not influence adversely the polymerization, and the amount of solvent is not critical. Preferred solvents are aliphatic hydrocarbons, alicyclic hydrocarbons, halogenated hydrocarbons and ethers. The polymerization temperature is usually in the range from $-40°$ C to $+80°$ C, preferably in the range from $-10°$ C to $+40°$ C.

The fractional purification of the polymer products in the bulk polymerization of tetrahydrofuran can be performed as follows: After stopping the polymerization by the addition of water, the reaction mixture is heated to recover the non-reacted monomer therefrom and then the mixture is allowed to stand for separating it into layers. The upper oily layer was heated together with alcoholic alkali (alkali such as sodium hydroxide dissolved in alcohol such as ethyl alcohol or methyl alcohol) under reflux for 3 to 5 hours to saponify the polymer so as to complete the hydrolysis of the radicals at the terminal ends of the polymer. The amount of the alkali should be preferably 2 to 6 mols per 1 mol of the organic acid anhydride used, which should be sufficient to make the oily layer alkaline, and the amount of the alcohol is preferably about the same with that of the polymer. Then, the alcohol is removed by distillation under reduced pressure, the mixture is dissolved in an organic solvent such as benzene, the solution was washed with water in order to remove impurities and, finally, the solvent was removed from the solution by distillation to obtain a polymer having hydroxyl radicals at both terminal ends of the molecule (polytetraethyleneether glycol).

As previously described, it is surprising that the polymerization activity can be greatly increased and become more satisfactory on a commercial basis by using the combination of organic acid anhydride, super acid salt and sulfuric acid together, as initiator. This could not have been predicted from prior knowledge.

The following table presents data concerning the yields of polymer using various initiators. It will be seen that the three component initiator of the present invention is clearly superior to the comparison initiators, which are mixtures of two of the three components.

| THF (parts) | $(CH_3CO)_2O$ (parts) | $NaClO_4$ (parts) | 98% $H_2SO_4$ (parts) | Polymerization Time (hrs.) | Yield of Polymer | Polymerization Temperature (°C) |
| --- | --- | --- | --- | --- | --- | --- |
| 100 (Invention) | 16 | 3 | 1.05 | 40 | 75.3 | 20 – 23 |
| 100 (Control) | 0 | 3 | 1.05 | 48 | 3.4 | 20 – 23 |
| 100 (Control) | 20 | 0 | 4 | 11 days | 0 | 20 – 23 |
| 100 (Control) | 16 | 0 | 1.05 | 48 | 0 | 20 – 23 |
| 100 (Control) | 16 | 3 | 0 | 168 | 0 | 20 – 23 |

This invention is further described by reference to the following illustrative examples, which merely serve to illustrate the invention but not restrict it. In the examples, parts and percent are all by weight.

EXAMPLE 1

Figure 1:
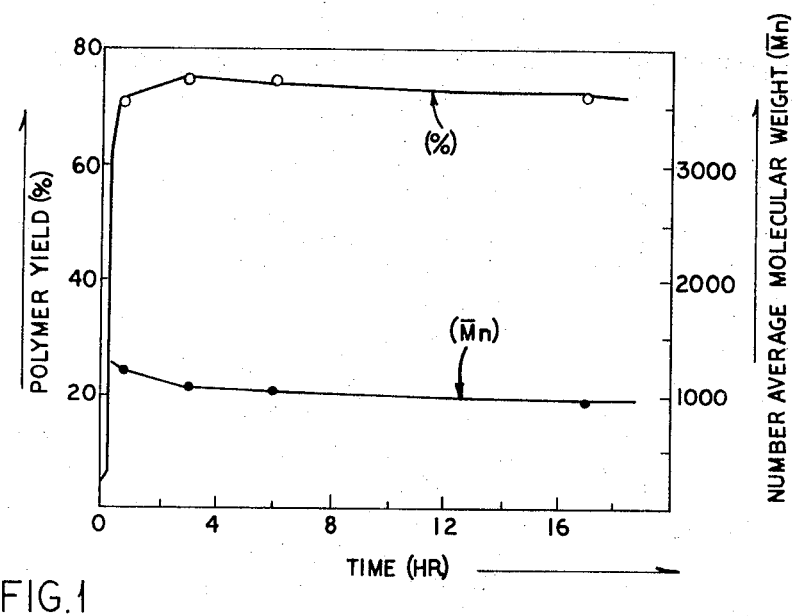
FIGS. 1 and 2 are graphs for showing the effects of the present invention.

9.8 Parts of sodium perchlorate were dissolved in 100 parts of tetrahydrofuran, to which 12.2 parts of acetic anhydride were added, and then 5.1 parts of 96% sulfuric acid were added with stirring. After keeping the mixture at 10° C for 45 minutes, water was added to stop the polymerization. The system was heated to vaporize and remove the unreacted tetrahydrofuran. After allowing the mixture to stand for separating it into layers, the oily layer was heated together with alcoholic sodium hydroxide under reflux for 3 hours to saponify the polymer. After ethyl alcohol was removed by distillation under reduced pressure, the mixture was then dissolved in benzene. The solution was washed with water and, finally, benzene was removed from the solution by distillation to obtain a polymer having hydroxyl radicals at both terminal ends of the molecule (polytetramethyleneether glycol).

| | |
| --- | --- |
| Yield of the polymer: | 70.7% |
| Number average molecular weight: | 1186 |
| Color number (APHA): | 5–10 |

EXAMPLE 2

22 Parts of orthosulfobenzoic anhydride and 12.2 parts of sodium perchlorate were dissolved in 100 parts of tetrahydrofuran. After adding 4 parts of 96% sulfuric acid, the mixture was kept at $21° \pm 1°$ C for 20 hours. After adding water to stop the polymerization, the system was heated to collect unreacted tetrahydrofuran. After allowing the mixture to stand to separate it into layers, the oily layer was treated similarly as in Example 1 to obtain polyether glycol having OHV = 99.5 and SV = 0.93.

| | |
| --- | --- |
| Yield of polymer: | 45.2% |
| Number average molecular weight: | 1117 |

EXAMPLE 3

4.2 Parts of anhydrous magnesium perchlorate were dissolved in 100 parts of tetrahydrofuran, and then 15.6 parts of acetic anhydride were added. 0.9 Part of 95% sulfuric acid was added dropwise with stirring. Then the mixture was kept at 20°–25° C for 30 hours. The product was treated similarly as in Example 1 and the following result was obtained:

| | |
| --- | --- |
| Yield of polymer: | 71.8% |
| Number average molecular weight: | 1260 |
| Total Cl, %: | 0.00% |

COMPARISON EXAMPLE 1

Polymerization was carried out under the same conditions as in Example 3 except that no sulfuric acid was added. In this case, the yield of polymer was only 21.6% even after keeping the system at 20° – 25° C for 65 hours. Thus, the remarkable effect of the ternary initiator of this invention can be recognized.

EXAMPLE 4

3.7 Parts of sodium perchlorate and 5 parts of succinic anhydride were dissolved in 100 parts of tetrahydrofuran, and then 2 parts of 98% sulfuric acid were added. The mixture was kept at $21° \pm 1°$ C for 20 hours, and was post-treated as described in Example 1 to obtain polytetramethyleneether glycol with a yield of 52.2%. The number average molecular weight of the polymer was 3,840.

EXAMPLE 5

10 Parts of sodium trifluoromethane sulfonate were dissolved in 100 parts of tetrahydrofuran, and after adding 18 parts of acetic anhydride, 2.84 parts of 95% sulfuric acid were added dropwise with stirring. The system was kept at 24° ± 1° C for 6 hours and post-treated as described in Example 1 to obtain polyether glycol with a yield of 53.4%, molecular weight (Mn) of 1,012, and a color number (APHA) of 5 - 10.

EXAMPLE 6

4.9 Parts of sodium perchlorate collected by the post-treatment described in Example 1 were dissolved in 100 parts of tetrahydrofuran, and after adding 12.2 parts of acetic anhydride and 2.55 parts of 98% sulfuric acid, the mixture was kept at 0° C for 6 hours, and was post-treated as described in Example 1 to obtain the following result.

| | |
|---|---|
| Yield of polymer: | 78.4% |
| Number average molecular weight: | 2160 |
| Color number (APHA): | 5-10 |

A polymerization was carried out under the same conditions as in Example 6 except that fresh sodium perchlorate was used, in place of recycled sodium perchlorate, and the following result was obtained:

| | |
|---|---|
| Yield of polymer: | 77.0% |
| Number average molecular weight: | 1987 |
| Color number (APHA): | 5-10 |

COMPARISON EXAMPLE 2

Polymerizations were carried out according to the process described in Example 1 using the initiator systems described below and the change with the passage of time was observed. The obtained data were compared.

A. Change with passage of time using the following acetic anhydride-$NaClO_4$-$H_2SO_4$ system (according to this invention).

| | |
|---|---|
| Tetrahydrofuran | 100 parts |
| Acetic anhydride | 12.2 parts |
| $NaClO_4$ | 9.8 parts |
| $H_2SO_4$ | 5.1 parts |
| Polymerization temperature, 10°C | |

| Time (hrs.) | 0.75 | 3.0 | 6.0 | 17.0 |
|---|---|---|---|---|
| Yield (%) | 70.7 | 74.7 | 74.7 | 71.8 |
| Number average molecular weight (Mn) | 1186 | 1075 | 1045 | 953 |
| Color number (APHA) | 5-10 | 5-10 | 5-10 | 5-10 |

The above result is graphically illustrated in FIG. 1.
B. Change with passage of time using an acetic anhydride-$HClO_4$ system (control).

| | |
|---|---|
| Tetrahydrofuran | 100 parts |
| Acetic anhydride | 12.2 parts |
| $HClO_4$ (70%) | 6.0 parts |
| Polymerization temperature, 10°C | |

| Time (hrs.) | 1 | 3 | 6 | 24 |
|---|---|---|---|---|
| Yield (%) | 45.1 | 60.9 | 65.5 | 70.7 |
| Mn | 1945 | 2550 | 2684 | 2304 |
| APHA | 20 | 40 | 60 | 130 |

Figure 2:
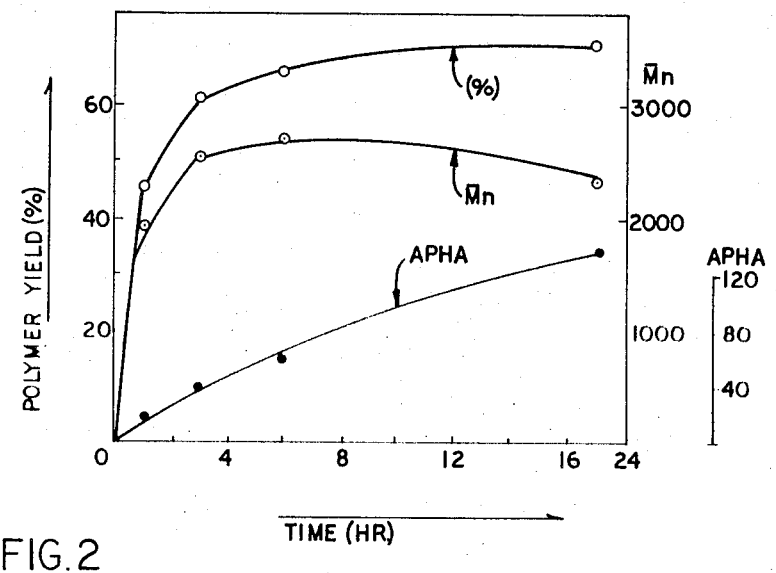

The above result is graphically illustrated in FIG. 2.

When more than 3 parts of $HClO_4$ (70%) is used, the degree of coloration of the polymers is greatly increased to APHA 100, i.e., Gardner +6 to +7.

In the comparison experiment (B) the polymer was greatly colored, and the amount of 70% $HClO_4$ had to be reduced in order to obtain a polymer having a color value of 5 - 10 APHA. In this case 20 - 40 hours were required for obtaining equilibrium of the system at the polymerization temperature of 10° C: (This time was not substantially different in a polymerization carried out at room temperature, i.e., 23° C). In the case of control experiment (B), the yield was not increased by increasing the amount of 70% $HClO_4$ but, rather, tended to become lower, adversely.

Compared with process (A), in comparison experiment (B) the time for obtaining an equilibrium state during polymerization was longer.

EXAMPLE 7

4.4 Parts of lithium perchlorate ($LiClO_4$) and 12.3 parts of acetic anhydride were dissolved in 100 parts of tetrahydrofuran, to which 1.25 part of 98% sulfuric acid was added at 10° C. The mixture was kept at 10° C for 16 hours. Water was then added to terminate the polymerization. The product was post-treated as described in Example 1 to obtain a polymer with a yield of 75.2%.

| | |
|---|---|
| Properties of polymer product: | |
| Hydroxyl group value (OHV): | 36.1 |
| Number average molecular weight: | 3108 |
| Color number of polymer (APHA): | 5-10 |

EXAMPLE 8

3.6 Parts of barium perchlorate, 12.3 parts of acetic anhydride and 24 parts of 95% sulfuric acid were added to 100 parts of tetrahydrofuran. After keeping the mixture at 10° C for 18 hours, water was added to terminate the polymerization. After post-treating as described in Example 1, the following result was obtained:

| | |
|---|---|
| Yield of polymer: | 45.3% |
| OHV: | 76.5 |
| Number average molecular weight: | 1467 |
| Color number of polymer (APHA): | 5-10 |

EXAMPLE 9

In a system consisting of 100 parts of tetrahydrofuran and 30 parts of dichlorethane (solvent), 4.9 parts of sodium perchlorate were dissolved, and then 6.1 parts of acetic anhydride were added. 2.55 Parts of 96% sulfuric acid were added, keeping the system at 10° C, and the mixture was allowed to stand at 10° C for 16 hours. After terminating the polymerization by adding water, the dichlorethane was distilled off together with unreacted tetrahydrofuran monomer. The following polymer was obtained after post-treatment as described in Example 1:

| | |
|---|---|
| Yield of polymer: | 68.0% |
| OHV: | 56.5% |
| Number average molecular weight: | 1986 |
| Color number of polymer (APHA) | 15-20 |

EXAMPLE 10

3.5 Parts of silver trifluoromethane sulfonate ($CF_3SO_3Ag$) were dissolved in 88 parts of tetrahydrofuran, to which 10 parts of acetic anhydride and then 1.5 part of 96% sulfuric acid were added. The polymerization was carried out at room temperature (23° C), and after allowing the reaction mixture to stand for 20 hours, water was added to stop the polymerization.

Then, the product was post-treated as described in Example 1, and the following polymer was obtained:

| | |
|---|---|
| Yield of polymer: | 65.9% |
| OHV: | 46.7 |
| Number average molecular weight: | 2403 |
| Color number of polymer (APHA): | 15 |

EXAMPLE 11

In 100 parts of tetrahydrofuran, 5.6 parts of trifluoromethanesulfonic methylamine salt were dissolved, to which 11.3 parts of acetic anhydride and 1.2 part of 96% sulfuric acid were added, and the mixture was allowed to stand at 20° C for 23 hours to polymerize. Water was added to stop the polymerization. The following polymer was obtained after post-treatment according to the process described in Example 1:

| | |
|---|---|
| Yield of polymer: | 67.4% |
| OHV: | 47.1 |
| Number average molecular weight: | 2382 |
| Color number of polymer (APHA): | 15 |

The embodiments of the invention in which an exclusive property or privilege is claimed are defined as follows:

1. A process for the polymerization of tetrahydrofuran, which comprises polymerizing tetrahydrofuran in the substantial absence of water and in the presence of (a) from 0.001 to 0.45 moles, per mole of tetrahydrofuran, of acid salt selected from the group consisting of sodium perchlorate, magnesium perchlorate, lithium perchlorate, barium perchlorate, sodium trifluoromethane sulfonate, silver trifluoromethane sulfonate, trifluoromethane sulfonic acid amine salt and mixtures thereof, (b) from 0.005 to 0.5 moles, per mole of tetrahydrofuran, of organic anhydride selected from the group consisting of acetic anhydride, succinic anhydride, maleic anhydride, orthosulfobenzoic anhydride and mixtures thereof and (c) from 1 to 2 moles, calculated as 100% sulfuric acid, per mole of said acid salt, of sulfuric acid having a concentration of at least 50 wt.%, at a polymerization temperature in the range of from −40° C to +80° C, and then hydrolyzing the terminal groups of the polymer molecules.

2. The process as claimed in claim 1, in which the amount of said acid salt (a) is from 0.001 to 0.20 moles, per mole of tetrahydrofuran.

3. The process as claimed in claim 2, in which the sulfuric acid (c) has a concentration of from 90 to 100%.

4. The process as claimed in claim 3, in which the polymerization temperature is from −10° C to +40° C.

5. The process as claimed in claim 1, in which the polymerization reaction is carried out in the absence of a solvent.

6. The process as claimed in claim 1, in which the polymerization reaction is carried out in the presence of an inert solvent selected from the group consisting of aliphatic hydrocarbons, alicyclic hydrocarbons, halogenated hydrocarbons and ethers.

* * * * *